United States Patent
Matsubara

(10) Patent No.: US 8,712,601 B2
(45) Date of Patent: Apr. 29, 2014

(54) VEHICLE CONTROL SYSTEM

(75) Inventor: Manabu Matsubara, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 140 days.

(21) Appl. No.: 13/226,792

(22) Filed: Sep. 7, 2011

(65) Prior Publication Data

US 2012/0078443 A1    Mar. 29, 2012

(30) Foreign Application Priority Data

Sep. 24, 2010  (JP) .................................. 2010-212977

(51) Int. Cl.
  *G05B 19/18*  (2006.01)
  *B60L 1/00*   (2006.01)
  *B60L 3/00*   (2006.01)
  *B60R 25/04*  (2013.01)
  *E05B 17/00*  (2006.01)
  *H01H 27/00*  (2006.01)

(52) U.S. Cl.
  USPC .............. 701/2; 180/286; 307/10.1; 307/10.3

(58) Field of Classification Search
  USPC ....................................... 307/10.1, 10.3, 10.6
  See application file for complete search history.

(56) References Cited

U.S. PATENT DOCUMENTS

| | | | | |
|---|---|---|---|---|
| 5,024,186 A * | 6/1991 | Long et al. | .................. | 123/179.4 |
| 7,053,758 B2 * | 5/2006 | Tanaka et al. | ............ | 340/426.27 |
| 7,561,031 B2 * | 7/2009 | Tanaka et al. | ............ | 340/426.27 |
| 2002/0108310 A1 * | 8/2002 | Schroer | ........................... | 49/280 |
| 2004/0145448 A1 * | 7/2004 | Tanaka et al. | ................ | 340/5.72 |
| 2009/0265048 A1 * | 10/2009 | Ono et al. | ......................... | 701/2 |
| 2010/0052845 A1 * | 3/2010 | Yamamoto et al. | ............ | 340/5.8 |

FOREIGN PATENT DOCUMENTS

| | | |
|---|---|---|
| JP | U-6-037566 | 5/1994 |
| JP | U-6-39637 | 5/1994 |
| JP | A-2002-356127 | 12/2002 |
| JP | A-2007-131069 | 5/2007 |
| JP | A-2009-067154 | 4/2009 |
| JP | A-2009-255836 | 11/2009 |
| WO | WO02/094621 A1 | 11/2002 |

OTHER PUBLICATIONS

Notice of Rejection issued in Japanese Patent Application No. 2010-212977 dated Feb. 12, 2014 (w/ partial translation).

* cited by examiner

*Primary Examiner* — Khoi Tran
*Assistant Examiner* — Robert Nguyen
(74) *Attorney, Agent, or Firm* — Oliff PLC

(57) ABSTRACT

A starting apparatus starts an engine of a vehicle in response to a wireless signal transmitted from a remote control and keeps the engine running when a door of the vehicle is opened after the engine of the vehicle has been started. Moreover, a function controller included in the starting apparatus disables a function of a powered window apparatus and a sunroof apparatus of the vehicle in response to start of the engine of the vehicle and enables the functions of the powered window apparatus and the sunroof apparatus when a door of the vehicle is opened after the engine of the vehicle has been started.

16 Claims, 9 Drawing Sheets

FIG.7

| ELECTRICAL EQUIPMENT | FUNCTION TO BE ENABLED |
|---|---|
| POWERED WINDOW APPARATUS | OPEN AND CLOSE OF WINDOW CORRESPONDING TO SUBJECT DOOR |
| CABIN LIGHTING | TURN ON CABIN LIGHTING OVER SEAT CORRESPONDING TO SUBJECT DOOR |
| SEAT HEATER | PRODUCE HEAT OF HEATING ELEMENT IN SEAT CORRESPONDING TO SUBJECT DOOR |
| RECLINING APPARATUS | MOVE BACKREST OF SEAT CORRESPONDING TO SUBJECT DOOR |
| SIDE MIRROR | OPEN AND CLOSE OF SIDE MIRROR CORRESPONDING TO SIDE ON WHICH SUBJECT DOOR IS LOCATED |
| EXTERNAL COMMUNICATIONS APPARATUS | TELEPHONE CALL FROM SEAT CORRESPONDING TO SUBJECT DOOR |

| ELECTRICAL EQUIPMENT | FUNCTION TO BE ENABLED |
|---|---|
| SUNROOF APPARATUS | OPEN AND CLOSE SUNROOF (LIMIT OPENABLE RANGE BY HALF) |
| WIPER APPARATUS | OPERATION OF WIPER BLADE (LIMIT THE NUMBER OF OPERATION TO A PREDETERMINED TIME) |
| WINDOW WASHER | SQUIRT OF WASHER LIQUID (LIMIT THE NUMBER OF SQUIRT TO A PREDETERMINED NUMBER) |
| INSTRUMENT PANEL | INFORMATION DISPLAY (LIMIT DISPLAY ITEMS) |
| NAVIGATION APPARATUS | DISPLAY OF NAVIGATION-RELATED INFORMATION (LIMIT BRIGHTNESS OF BACK-LIGHTING) |
| AUDIO APPARATUS | OUTPUT OF SOUND (LIMIT VOLUME) |

FIG.9

VEHICLE CONTROL SYSTEM

BACKGROUND OF THE INVENTION

1. Field of the Invention

The invention relates to a technology that starts an engine in response to wireless signals transmitted from a remote control.

2. Description of the Background Art

Remote engine starting technologies are known that allow a user to remotely start an engine mounted on a vehicle by operating a remote control and that warm up the engine before the user gets in the vehicle. If using such a technology, for example, in a cold region, the user may start driving the vehicle once getting in the vehicle because the engine of the vehicle has already been warmed up.

Such a remote engine starting technology stops the engine of the vehicle running when the user unlocks or opens a door of the vehicle. If the engine is allowed to keep running without being stopped, there is a possibility that an improper user who is not a proper user may intrude into and try to steal the vehicle during a time period from when the user remotely starts the engine to when he/she arrives at the vehicle.

However, it is inconvenient for a proper user that he/she needs to restart the engine stopped that was remotely started when getting in the vehicle.

In order to solve the inconvenience, a technology has been proposed that performs authentication based on a wireless signal transmitted from a wireless key during the time period from when the user remotely starts the engine to when he/she arrives at the vehicle, and that keeps the engine running when the authentication is successful. When the authentication is unsuccessful, the conventional technology stops the engine running or outputs an alarm.

When the user remotely starts the engine, the conventional technology disables functions of most of in/on-vehicle electrical equipment, such as powered windows, until the vehicle becomes ready to run. Therefore, it is inconvenient for a user because the user cannot use the functions of most of the electrical equipment during a time period from when the user gets in the vehicle to when the vehicle becomes ready to run.

SUMMARY OF THE INVENTION

According to one aspect of the invention, a vehicle control system used for a vehicle includes an engine starter that starts an engine of the vehicle in response to a first wireless signal transmitted from a remote control and that keeps the engine running when a door of the vehicle is opened after the engine starts. Moreover, the vehicle control system includes a function controller that (i) disables a function of a window apparatus of opening and closing a window provided on the vehicle, in response to start of the engine by the engine starter, and (ii) enables the function of the window apparatus when the door is opened after the engine has been started by the engine starter.

The function of the window apparatus is enabled when the door is opened after the engine has been started. Therefore, since the window cannot be opened or closed until the door is opened, intrusion into or an unauthorized use of the vehicle by an improper user can be prevented. Moreover, since the window can be opened or closed after the door is opened, convenience of the user is improved.

According to another aspect of the invention, the vehicle control system further includes: an antenna that receives a second wireless signal transmitted from a wireless key; an authentication part that determines, based on the second wireless signal received, whether or not the wireless key is authentic; and a lock controller that unlocks a lock mechanism of the door when the wireless key is determined to be authentic.

Since the lock mechanism of the door is unlocked when the wireless key is determined to be authentic, intrusion into or an unauthorized use of the vehicle by an improper user can be effectively prevented.

According to another aspect of the invention, a vehicle control system used for a vehicle includes: an engine starter that starts an engine of the vehicle in response to a first wireless signal transmitted from a remote control and that keeps the engine running when a door of the vehicle is opened after the engine starts Moreover, the vehicle control system includes a function controller that (i) disables both a function of first electrical equipment for a non-driving system that is not related to driving of the vehicle and a function of second electrical equipment for a driving system that is related to the driving of the vehicle, in response to start of the engine by the engine starter, (ii) enables the function of the first electrical equipment when the door is opened after the engine has been started by the engine starter, and (iii) enables the function of the second electrical equipment when an ignition switch of the vehicle is turned on with an engine key.

Since the function of the first electrical equipment for the non-driving system is enabled when the door is opened after the engine has been started, convenience of the user is improved. Moreover, since the function of the second electrical equipment for the driving system is enabled when the ignition switch of the vehicle is turned on with the engine key, stealing of the vehicle can be prevented.

Therefore, the object of the invention is to improve convenience of a user after the user remotely starts an engine of a vehicle.

These and other objects, features, aspects and advantages of the invention will become more apparent from the following detailed description of the invention when taken in conjunction with the accompanying drawings.

BRIEF DESCRIPTION OF THE DRAWINGS

FIG. 7 illustrates functions of electrical equipment to be enabled;

FIG. 9 illustrates functions of electrical equipment to be enabled.

DESCRIPTION OF THE EMBODIMENTS

Hereinbelow, an embodiment of the invention is described with reference to the drawings.

1. First Embodiment

1-1. Outline of Functions of Vehicle Control System

Figure 1:
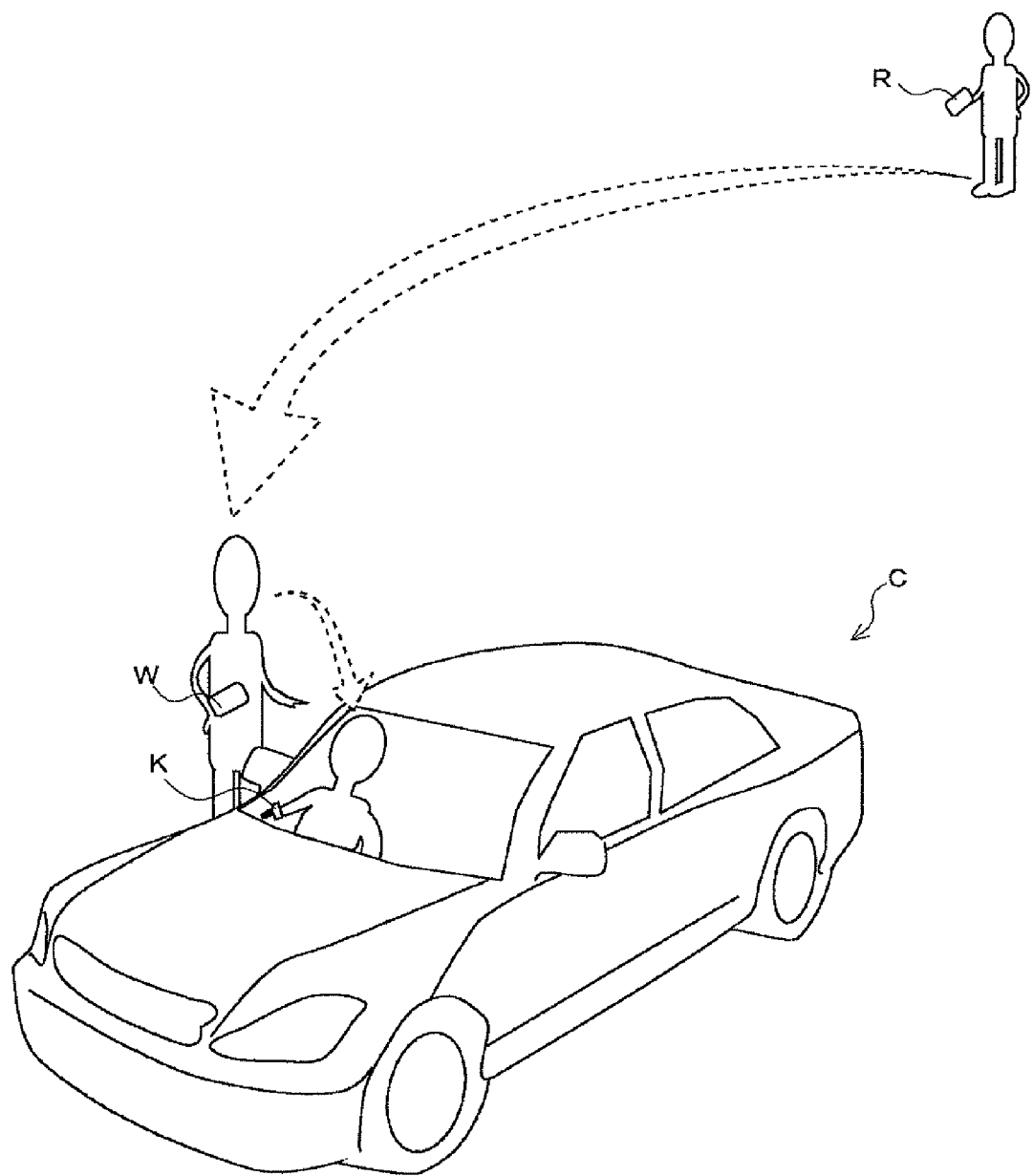
FIG. 1 illustrates an outline of functions of a vehicle control system.

FIG. 1 illustrates an outline of typical functions of a vehicle control system that is an embodiment. The vehicle control system is mounted on a vehicle C.

As shown in FIG. 1, the vehicle control system includes a function that starts an engine mounted on the vehicle C in response to a wireless signal transmitted from a remote control R when a user operates the remote control R at a location away from the vehicle C.

In addition, the vehicle control system includes a function that unlocks a door lock mechanism of a door of the vehicle C after authentication is successful in the authentication process implemented by the vehicle control system based on a wireless signal transmitted from the wireless key W when the user operates a wireless key W to get in the vehicle C. Moreover, the vehicle control system includes a function that enables functions of a part of electrical equipment installed in/on the vehicle C to allow the user to use the functions.

Furthermore, the vehicle control system includes a function that causes the vehicle C to be ready to run after an authentication process implemented based on a signal transmitted from an engine key K when the user inserts the engine key K into a key cylinder in the vehicle C. The vehicle control system includes various functions other than the functions described above.

A proper user of the vehicle C owns such remote control R, wireless key W, and engine key K. On the other hand, an improper user does not own such the authentic remote control R, wireless key W, and engine key K.

1-2. Configuration of Vehicle Control System

Figure 2:
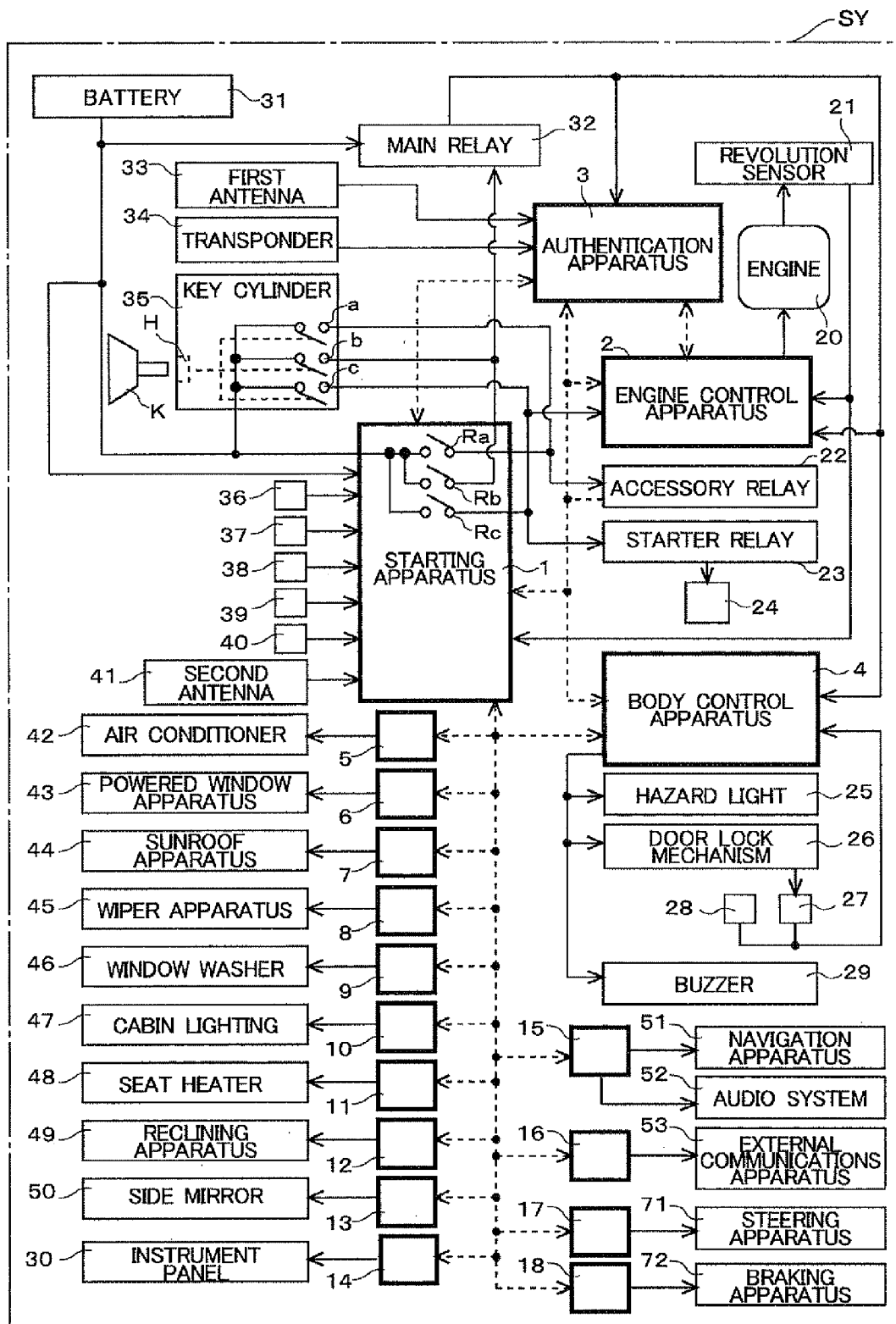
FIG. 2 illustrates a configuration of the vehicle control system.

Next described is a configuration of the vehicle control system. FIG. 2 illustrates a configuration of the vehicle control system.

A vehicle control system SY includes a starting apparatus 1, an engine control apparatus 2, and an authentication apparatus 3 as control apparatuses relating to starting or driving of an engine 20 of the vehicle C.

Moreover, the vehicle control system SY includes electrical equipment for a non-driving system (hereinafter referred to as non-driving-system electrical equipment) that is not directly related to the driving of the vehicle C and electrical equipment for a driving system (hereinafter referred to as driving-system electrical equipment) that is directly related to the driving of the vehicle C. The vehicle control system SY includes, as the non-driving-system electrical equipment, for example, an air conditioner 42, a powered window apparatus 43, a sunroof apparatus 44, a wiper apparatus 45, a window washer 46, a cabin lighting 47, a seat heater 48, a reclining apparatus 49, a side mirror 50, a hazard light 25, a door lock mechanism 26, a buzzer 29, an instrument panel 30, a navigation apparatus 51, an audio apparatus 52, and an external communications apparatus 53. Moreover, as the driving-system electrical equipment, the vehicle control system SY includes, for example, a steering apparatus 71 and a braking apparatus 72.

The electrical equipment individually includes an electrically-controllable constituent element. For example, the air conditioner 42 includes an air conditioner motor, the powered window apparatus 43 includes a window motor, the sunroof apparatus 44 includes a sunroof motor, the wiper apparatus 45 includes a wiper motor, the window washer 46 includes a pump motor, the cabin lighting 47 includes light sources, the seat heater 48 includes a heating element, the reclining apparatus 49 includes a reclining motor, the side mirror 50 includes a mirror motor, the hazard light 25 includes a light source, the door lock mechanism 26 includes a lock motor, the buzzer 29 includes a vibrating element, the navigation apparatus 51 includes a display, the audio apparatus 52 includes an amplifier, and the external communications apparatus 53 includes a communications circuit. Moreover, the steering apparatus 71 includes a steering motor, and the braking apparatus 72 includes a hydraulic pump.

In order to control the electrical equipment, the vehicle control system SY includes a plurality of control apparatuses. Concretely, the vehicle control system SY includes a body control apparatus 4, an air conditioner control apparatus 5, a powered window control apparatus 6, a sunroof control apparatus 7, a wiper control apparatus 8, a washer control apparatus 9, a light control apparatus 10, a seat heater control apparatus 11, a reclining control apparatus 12, a mirror control apparatus 13, an instrument panel control apparatus 14, a navigation control apparatus 15, a communications control apparatus 16, a steering control apparatus 17, and a braking control apparatus 18.

Furthermore, the vehicle control system SY includes a configuration for supplying electric power to the electrical equipment from a battery 31 that is a main power supply of the vehicle C. Concretely, the vehicle control system SY includes an accessory relay 22 that enables power supply to electrical equipment for accessories, a starter relay 23 that enables power supply to a starter motor 24, and a main relay 32 that enables power supply to electrical equipment for non-accessories.

In addition, the vehicle control system SY includes a configuration for receiving wireless signals from external apparatuses. Concretely, the vehicle control system SY includes a first antenna 33 that receives a wireless signal transmitted from the wireless key W, a transponder 34 that receives a wireless signal transmitted from the engine key K, and a second antenna 41 that receives a wireless signal transmitted from the remote control R. The wireless signal transmitted from the remote control R is a command signal for commanding the engine 20 to start.

Moreover, the vehicle control system SY includes switches for detecting various statuses. Concretely, the vehicle control system SY includes a key insertion switch 36 for detecting insertion of the engine key K into a key cylinder 35, a foot brake switch 37 for detecting an operation to a foot brake, an engine hood switch 38 for detecting open/close of an engine hood, a shift lever switch 39 for detecting a position of a shift lever, a lock switch 27 for detecting a locking status of the door lock mechanism 26, and a door courtesy switch 28 for detecting open/close of a door of the vehicle C.

The key cylinder 35 includes a first ACC switch a, a first ignition switch b, and a first starter switch c. The switches a, b, and c are turned on by a user operation made with the engine key K inserted in a key insertion opening H formed on the key cylinder 35. When the first ACC switch a is turned on, the accessory relay 22 is turned on and electric power is supplied from the battery 31 to the electrical equipment for the non-accessories. When the first ignition switch b is turned on, the main relay 32 is turned on and electric power is supplied from the battery 31 to the electrical equipment for the accessories. When the first starter switch e is turned on, the starter relay 23 is turned on and electric power is supplied to the starter motor 24 and then the engine 20 starts.

Moreover, the vehicle control system SY includes a sensor for detecting a physical phenomenon. Concretely, the vehicle control system SY includes a vehicle speed sensor 40 for detecting speed of the vehicle C and a revolution sensor 21 for counting the number of revolutions of the engine 20.

The engine control apparatus 2 controls the number of revolutions of the engine 20 after the starter relay 23 is turned on and the starter motor 24 starts to run. The engine control apparatus 2 adjusts, based on a signal from the revolution sensor 21, the number of revolutions of the engine 20 by controlling a spark plug, an injector, a throttle, etc. The engine control apparatus 2 includes a controller having a microcomputer. The controller includes a CPU, a ROM, a RAM, etc. An arithmetic processing performed by the CPU based on a program stored in the ROM implements functions of the engine control apparatus 2. The CPU uses the RAM as a working area of the arithmetic processing.

The starting apparatus 1 starts the engine 20 in response to a wireless signal from the remote control R. The starting apparatus 1 includes a second ACC switch Ra, a second ignition switch Rb, and a second starter switch Rc. The switches Ra, Rb, and Rc are turned on in response to wireless signals transmitted from the remote control R. When the second ACC switch Ra is turned on, the accessory relay 22 is turned on and electric power is supplied from the battery 31 to the electrical equipment for the non-accessories. When the second ignition switch Rb is turned on, the main relay 32 is turned on and electric power is supplied from the battery 31 to the electrical equipment for the accessories. When the second starter switch Rc is turned on, the starter relay 23 is turned on and electric power is supplied to the starter motor 24 and then the engine 20 starts.

The starting apparatus 1 can supply the electric power to varied electrical equipment from the battery 31 by turning on the switches Ra, Rb, and Rc, and can start the engine 20.

Moreover, the starting apparatus 1 includes functions of disabling and enabling functions of the electrical equipment.

Figure 3:
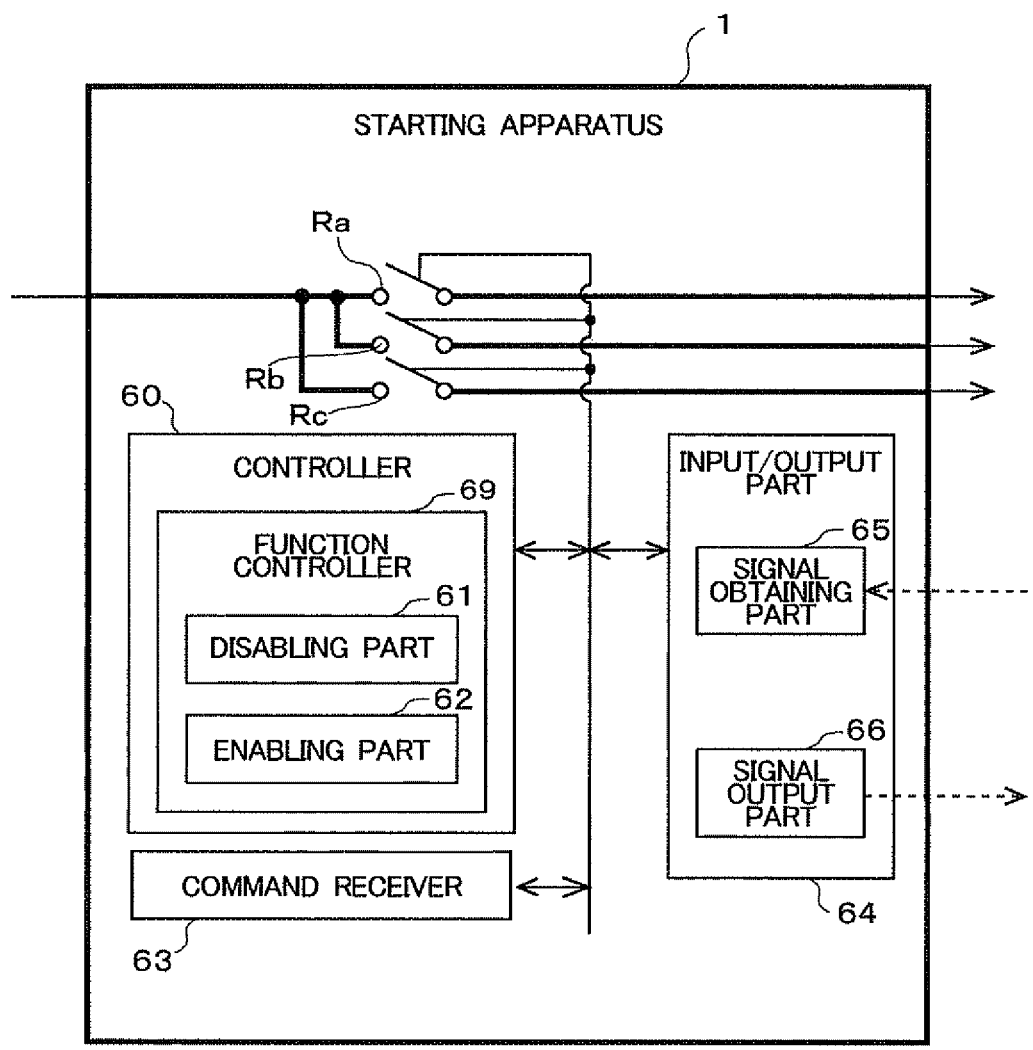
FIG. 3 illustrates a detailed configuration of a starting apparatus.

FIG. 3 illustrates a detailed configuration of the starting apparatus 1. Besides aforementioned three switches Ra, Rb, and Re, the starting apparatus 1 includes a controller 60, a command receiver 63, and an input/output part 64.

The controller 60 is, for example, a microcomputer and includes a CPU, a ROM, a RAM, etc. An arithmetic processing performed by the CPU based on a program stored in the ROM implements functions, such as turning-on of the switches Ra, Rb, and RC, of the controller 60. The CPU uses the RAM as a working area of the arithmetic processing.

The controller 60 includes a function controller 69 to serve as one of functions of the controller 60. The function controller 69 includes a disabling part 61 and an enabling part 62. The disabling part 61 disables the functions of the electrical equipment. The enabling part 62 enables the functions of the electrical equipment.

The command receiver 63 receives a wireless signal, as a command signal, that has been received by the second antenna 41 from the remote control R, and transmits a signal indicating contents of the command to the controller 60.

The input/output part 64 is an interface that controls input and output of signals between the starting apparatus 1 and one or more other control apparatuses. The input/output part 64 includes a signal obtaining part 65 that receives a signal transmitted to the starting apparatus 1, and a signal output part 66 that transmits a signal from the starting apparatus 1 to one or more other control apparatuses. When the disabling part 61 disables a function of the electrical equipment or when the enabling part 62 enables a function of the electrical equipment, a predetermined signal is transmitted from the signal output part 66 to a control apparatus that controls a subject piece of the electrical equipment.

Referring back to FIG. 2, in response to a wireless signal received by the first antenna 33, the transponder 34, or the second antenna 41, the authentication apparatus 3 performs an authentication process to determine whether or not a sender apparatus of the wireless signal (the remote control R, the wireless key W, or the engine key K) is authentic.

The authentication apparatus 3 includes a controller having a microcomputer. The controller includes a CPU, a ROM, a RAM, etc. An arithmetic processing performed by the CPU based on a program stored in the ROM implements functions, including the authentication process, of the authentication apparatus 3. The CPU uses the RAM as a working area of the arithmetic processing.

Based on a result of the authentication performed by the authentication apparatus 3, the body control apparatus 4 controls the door lock mechanisms 26 and unlocks the door lock mechanisms 26. Moreover, based on a result of the authentication performed by the authentication apparatus 3, the body control apparatus 4 controls the buzzer 29 and causes the buzzer 29 to output an alarm. The body control apparatus 4 includes a controller having a microcomputer. The controller includes a CPU, a ROM, and a RAM, etc. An arithmetic processing performed by the CPU based on a program stored in the ROM implements functions of the body control apparatus 4. The CPU uses the RAM as a working area of the arithmetic processing.

The air conditioner control apparatus 5 controls the air conditioner 42 to maintain the cabin of the vehicle C at a temperature set by the user.

The powered window control apparatus 6 controls the powered window apparatus 43 in response to a user operation, and opens and closes a window provided on the vehicle C.

The sunroof control apparatus 7 controls the sunroof apparatus 44 in response to a user operation, and opens and closes the sunroof provided on the vehicle C. The sunroof can be considered as a type of windows provided on the vehicle C. The sunroof apparatus 44 can be considered as a type of a window apparatus.

The wiper control apparatus 8 controls the wiper apparatus 45 in response to a user operation, and causes a wiper blade to work to clear water drops on a front windshield of the vehicle C.

The washer control apparatus 9 controls the window washer 46 in response to a user operation, and causes the window washer 46 to squirt windshield washer fluid to the front windshield.

The light control apparatus 10 controls the cabin lighting 47 in response to a user operation, and turns on a light source that illuminates the cabin of the vehicle C.

The seat heater control apparatus 11 controls the seat heater 48 in response to a user operation, and causes the heating element installed in a seat to produce heat.

The reclining control apparatus 12 controls the reclining apparatus 49 in response to a user operation, and causes, for example, the backrest of the seat to move.

The mirror control apparatus 13 controls the side mirror 50 in response to a user operation, and changes an angle of the side mirrors 50.

The instrument panel control apparatus 14 controls the instrument panel 30, and causes information of speed of the vehicle C, fuel level, the number of revolution of the engine of the vehicle C, etc. to be displayed on the instrument panel 30.

The navigation control apparatus 15 controls the navigation apparatus 51, and causes navigation information to be displayed on the display of the navigation apparatus 51.

Moreover, the navigation control apparatus 15 controls the audio apparatus 52, and causes the audio apparatus 52 to play music media such as a CD.

The communications control apparatus 16 controls the external communications apparatus 53 such as a telephone, and enables an external telephone call.

The steering control apparatus 17 controls the steering apparatus 71 in response to a user operation, and causes a steering angle to be changed.

The braking control apparatus 18 controls the braking apparatus 72 in response to a user operation, and causes a brake pressure to be changed.

1-3. Engine Start with Engine Key

Next described is a process of starting the engine 20 with the engine key K. First, a user inserts the engine key K into the key insertion opening H formed on the key cylinder 35 and turns on the first starter switch c by turning the engine key K. When the first starter switch c is turned on, the battery 31 is electrically connected to the starter motor 24, and then the starter motor 24 starts to run. In other words, while the user is operating the engine key K to turn on the first starter switch c, the starter motor 24 starts to run.

Then, the user determines based on, for example, the engine sound, that the engine 20 has reached a predetermined revolving speed (e.g., 1500 rpm), and then stops the operation made with the engine key K, which starts the engine.

When detecting turn-on of the first starter switch c, the engine control apparatus 2 controls the spark plugs and the injectors of the engine 20 in response to a signal from the revolution sensor 21 and causes the engine 20 to be idling. The starter motor 24 assists the engine 20 in revolving until the engine 20 reaches the predetermined revolving speed.

1-4. Authentication Process

Next, authentication processes are described in which the authentication apparatus 3 determines whether or not each of the remote control R, the wireless key W and the engine key K is authentic.

First described is an authentication process relating to the engine key K. When the user inserts the engine key K into the key insertion opening H, the transponder 34 receives a wireless signal from the engine key K. The wireless signal indicates an identification data (ID) unique to the engine key K. The ID is stored in a nonvolatile storage in the engine key K. The transponder 34 transmits to the authentication apparatus 3 the ID of the engine key K indicated by the wireless signal received.

The authentication apparatus 3 determines whether or not the ID of the engine key K matches the ID pre-stored in the authentication apparatus 3. If these IDs match each other, the authentication apparatus 3 transmits to the engine control apparatus 2 a signal indicating that an authentication result is successful (in other words, the engine key K is determined to be authentic). On the other hand, if these IDs do not match each other, the authentication apparatus 3 transmits to the engine control apparatus 2 a signal indicating that an authentication result is unsuccessful (in other words, the engine key K is determined to be unauthentic).

When the first starter switch c is turned on and also when the authentication result relating to the ID of the engine key K is successful, the engine control apparatus 2 starts the engine of the vehicle C.

When the authentication result relating to the ID of the engine key K is unsuccessful in the authentication by the authentication apparatus 3, the body control apparatus 4 causes the buzzer 29 and/or the hazard light 25 to operate and reports an unauthorized use of the vehicle C to the outside of the vehicle.

Next described is an authentication process relating to the wireless key W. The wireless key W operated by the user transmits to the vehicle control system SY a wireless signal commanding the door lock mechanisms 26 to unlock, and the first antenna 33 of the vehicle control system SY receives the wireless signal. The wireless signal indicates an ID unique to the wireless key W. The authentication apparatus 3 receives the ID of the wireless key W indicated by the wireless signal.

The authentication apparatus 3 determines whether or not the ID of the wireless key W matches the ID pre-stored in the authentication apparatus 3. If these IDs match each other, the authentication apparatus 3 transmits to the body control apparatus 4 a signal indicating that the authentication result is successful (in other words, the wireless key W is determined to be authentic). On the other hand, if these IDs do not match each other, the authentication apparatus 3 transmits to the body control apparatus 4 a signal indicating that the authentication result is unsuccessful (in other words, the wireless key W is determined to be unauthentic).

When the authentication result relating to the ID of the wireless key W is successful, the body control apparatus 4 unlocks the door lock mechanisms 26. On the other hand, when the authentication result relating to the ID of the wireless key W is unsuccessful, the body control apparatus 4 does not unlock the door lock mechanisms 26. When the door lock mechanism 26 is unlocked, the user can open the door by pulling the door handle.

Next described is an authentication process relating to the remote control R. The remote control R operated by the user transmits to the vehicle control system SY a wireless signal commanding the engine 20 to start, and the second antenna 41 of the vehicle control system SY receives the wireless signal. The wireless signal indicates an ID unique to the remote control R. When receiving the wireless signal via the second antenna 41, the starting apparatus 1 transmits to the authentication apparatus 3 the ID of the remote control R indicated by the wireless signal received.

The authentication apparatus 3 determines whether or not the ID of the remote control R matches the ID pre-stored in the authentication apparatus 3. If these IDs match each other, the authentication apparatus 3 transmits to the starting apparatus 1 a signal indicating that the authentication result is successful (in other words, the remote control R is determined to be authentic). On the other hand, if these IDs do not match each other, the authentication apparatus 3 transmits to the starting apparatus 1 a signal indicating that the authentication result is unsuccessful (in other words, the remote control R is determined to be unauthentic).

When the authentication result relating to the ID of the remote control R is successful, the starting apparatus 1 turns on the switches Ra, Rb, and Re, and then starts the engine 20. In this case, the user can remotely start the engine 20 of the vehicle C with the remote control R.

1-5. Engine Start with Remote Control

Next described is a process of remotely starting the engine 20 with the remote control R.

When the user operates a start button provided on the remote control R, the remote control R transmits, in response to the user operation, to the vehicle C a wireless signal commanding the engine 20 to start. When receiving the wireless signal via the second antenna 41, the starting apparatus 1 starts the engine 20 in response to the signal.

When receiving the signal, the starting apparatus 1 determines whether all predetermined conditions described later are satisfied. When all the predetermined conditions are satisfied, the starting apparatus 1 determines that the vehicle C is in a state where the engine 20 of the vehicle C can start, and turns on the second ACC switch Ra, the second ignition switch Rb, and the second starter switch Rc of the starting apparatus 1. As a result, electric power is supplied from the battery 31 to the electrical equipment of the accessories and the non-accessories, and the starter motor 24 starts to run, and then the engine 20 starts.

The conditions (A) to (E) listed below are examples of the predetermined conditions.

(A) The engine key K is not inserted.
(B) The foot brake is not applied.
(C) The engine hood is not opened.
(D) The shift lever is in the park position.
(E) The door lock mechanism 26 is locked.

Whether the condition (A) is satisfied is determined based on a signal from the key insertion switch 36. Whether the condition (B) is satisfied is determined based on a signal from the foot brake switch 37. Whether the condition (C) is satisfied is determined based on a signal from the engine hood switch 38. Whether the condition (D) is satisfied is determined based on a signal from the shift lever switch 39. Whether the condition (E) is satisfied is determined based on a signal from the lock switch 27.

When the engine 20 is remotely started in such a manner, the disabling part 61 of the starting apparatus 1 transmits a signal to control apparatuses that controls the electrical equipment and prohibits the control of the electrical equipment. Accordingly, functions of the electrical equipment are disabled. The details of this process will be described later.

1-6. Operation Mode After Remote Start

The vehicle control system SY includes a normal mode and a continuation mode as operation modes for the engine 20 that has been remotely started. The normal mode is an operation mode that stops the engine 20 when the user gets in the vehicle C. On the other hand, the continuation mode is an operation mode that keeps the engine 20 running when the user gets in the vehicle C. The user can select one from amongst the two operation modes by operating the remote control R or a switch in the cabin of the vehicle C. Hereinbelow, each of the two operation modes is described in detail.

1-6-1. Normal Mode

The normal mode of the operation modes is first described. In the normal mode of the operation modes, when the user gets in the vehicle C after remotely starting the engine 20 by operating the remote control R, the running of the engine 20 is stopped.

Concretely, when the door lock mechanism 26 is unlocked after the engine 20 has been remotely started, a signal indicating the unlocking of the door lock mechanism 26 is transmitted from the lock switch 27 to the body control apparatus 4. Moreover, when a door of the vehicle C is opened, a signal indicating the open of the door is transmitted from the door courtesy switch 28 to the body control apparatus 4. Those two signals are further transmitted to the starting apparatus 1 from the body control apparatus 4.

In the normal mode of the operation modes, when receiving one of those signals after the start of the engine 20, the starting apparatus 1 transmits to the engine control apparatus 2 a stop signal commanding the engine 20 to stop. When receiving the stop signal, the engine control apparatus 2 stops the engine 20 running.

Therefore, during a time period from when the user starts the engine 20 at a place away from the vehicle C to when the user gets in the vehicle C, even if an improper user tries to start the vehicle C of which the engine 20 is running, the engine 20 is stopped once the improper user opens a door of the vehicle C. As a result, the vehicle C can be protected from being stolen by an improper user.

Moreover, in the normal mode of the operation modes, the functions of the electrical equipment installed in/on the vehicle C are disabled during a time period from when the user remotely starts the engine 20 to when the vehicle C becomes ready to run. The vehicle C becomes ready to run by a user operation of inserting the engine key K and of operating the engine key K.

If the function of the powered window apparatus 43 or the function of the sunroof apparatus 44 remained enabled even after the user remotely starts the engine 20, an improper user would be able to make a window or the sunroof of the vehicle C fully opened by operating an open/close button provided in the cabin of the vehicle C using, for example, a wire inserted through a small opening or the like of a window of the vehicle C. As a result, in this case, there is a higher possibility that an improper user intrudes into and illegally uses the vehicle C. Therefore, stealing by an improper user can be effectively prevented by disabling the functions of the electrical equipment.

However, in the normal mode of the operation modes, even when a proper user gets in the vehicle C, the engine 20 stops. Therefore, the user may feel inconvenient because he/she needs to restart the engine 20 after getting in the vehicle C, although remotely starting the engine 20 with the remote control R. Moreover, the user cannot use the functions of the electrical equipment in/on the vehicle C during the time period from he/she gets in the vehicle C to when the vehicle C becomes ready to run. However, these inconveniences are eliminated in the continuation mode.

1-6-2. Continuation Mode

Next, the continuation mode of the operation modes is described. In the continuation mode of the operation modes, when the user gets in the vehicle C after remotely starting the engine 20 by operating the remote control R, the engine 20 is kept running.

Concretely, when the door lock mechanism 26 is unlocked after the engine 20 has been remotely started, a signal indicating the unlocking of the door lock mechanism 26 is transmitted from the lock switch 27 to the body control apparatus 4. Moreover, when a door of the vehicle C is opened, a signal indicating the opening of the door is transmitted from the door courtesy switch 28 to the body control apparatus 4. Those two signals are further transmitted to the starting apparatus 1 from the body control apparatus 4.

In the continuation mode of the operation modes, when receiving those signals after the start of the engine 20, the starting apparatus 1 transmits to the engine control apparatus 2 a continuation signal commanding the engine 20 to keep running. When receiving the continuation signal, the engine control apparatus 2 keeps the engine 20 running without stopping.

Therefore, even when remotely starting the engine 20, the user can start to move the vehicle C without restarting the engine 20 after he/she gets in the vehicle C.

Moreover, in the continuation mode of the operation modes, after the engine 20 has been remotely started, the functions of the non-driving-system electrical equipment that is not related to a security concern are enabled during a time period from when the user gets in the vehicle C to when the vehicle C becomes ready to run.

Therefore, convenience is improved because the user can use the functions of the electrical equipment in/on the vehicle C even during the time period from when the user gets in the vehicle C to when the vehicle C becomes ready to run. Hereinbelow, a process of disabling and enabling the functions of the electrical equipment is described in detail.

1-7. Time-Line Chart

Figure 4:
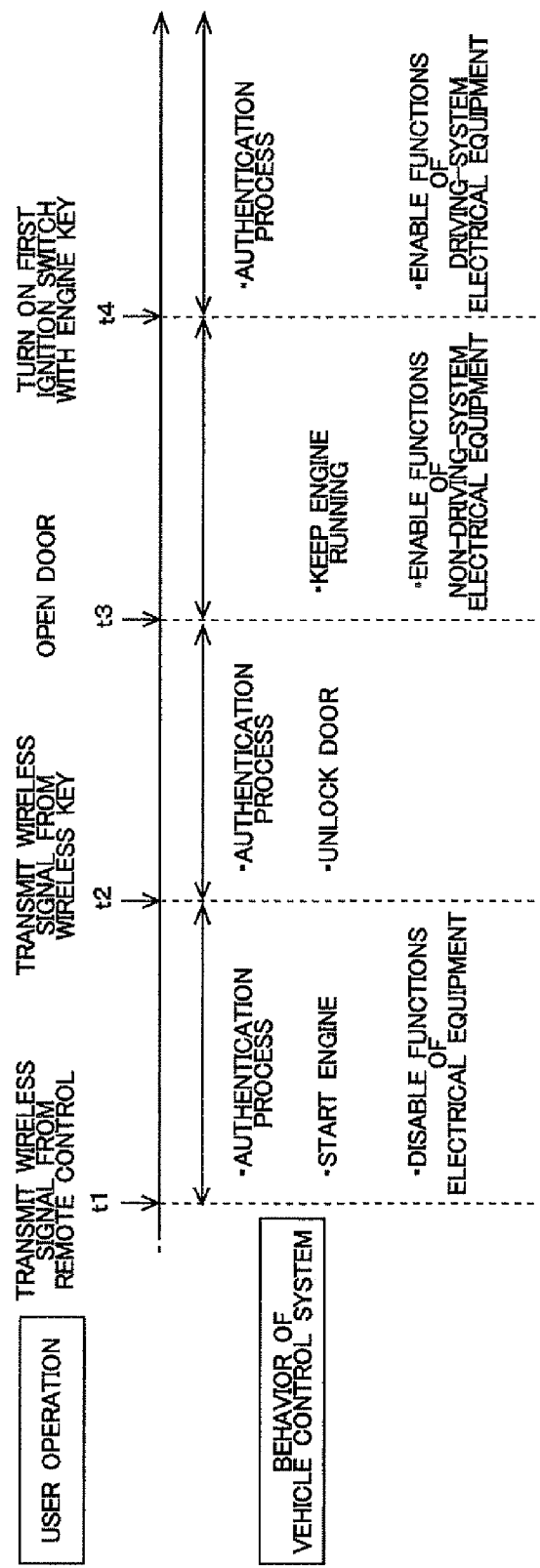
FIG. 4 illustrates a timeline chart that shows a process of the vehicle control system.

FIG. 4 illustrates a time-line chart showing a flow of a process performed by the vehicle control system SY in the continuation mode of the operation modes. In this chart, the axis of abscissas represents time, and each of numerical references t1, t2, t3, and t4 represents a time point.

1-7-1. Time Point t1

The user operates the remote control R, at t1, for remotely starting the engine 20. At the same time, the user operates the remote control R for turning on the air conditioner 42.

In response to the user operations, the remote control R transmits to the vehicle control system SY of the vehicle C a wireless signal commanding the engine 20 to start (hereinafter referred to as "remote start signal") and a wireless signal commanding the air conditioner 42 to start operating. The remote start signal includes the ID unique to the remote control R.

When receiving the remote start signal via the second antenna 41, the starting apparatus 1 included in the vehicle control system SY transmits the ID included in the remote start signal to the authentication apparatus 3. The authentication apparatus 3 performs the authentication process based on the ID of the remote control R received. The authentication apparatus 3 transmits to the starting apparatus 1 an authentication result of the authentication process. When the authentication result is successful, the starting apparatus 1 turns on the switches Ra, Rb, and Re and then starts the engine 20.

When receiving via the second antenna 41 the wireless signal commanding the air conditioner 42 to start operating, the starting apparatus 1 transmits to the air conditioner control apparatus 5 a wireless signal commanding the air conditioner 42 to start operating. When receiving the signal, the air conditioner control apparatus 5 adjusts the temperature of the cabin of the vehicle C by causing the air conditioner 42 to start operating.

Moreover, in response to the start of driving of the engine 20, the disabling part 61 of the starting apparatus 1 transmits to each of the control apparatuses other than the engine control apparatus 2, the authentication apparatus 3, and the air conditioner control apparatus 5, a prohibition signal prohibiting control of the electrical equipment. After receiving the prohibition signal, each of the control apparatuses does not respond to a user operation and does not implement control. Therefore, the functions of the electrical equipment are disabled. At this time, the functions of both the non-driving-system electrical equipment, such as the powered window apparatus 43, and the driving-system electrical equipment, such as the steering apparatus 71, are disabled.

There is a relatively high possibility that the vehicle C is stolen by an improper user during the time period from when the user remotely starts the engine 20 away from the vehicle C to when the user arrives at the vehicle C, because the engine 20 of the vehicle C is running. Therefore, the vehicle control system SY disables the functions of the electrical equipment unrelated to the running of the engine 20, temperature adjustment of the cabin, and the authentication process. Thus, stealing of the vehicle C by an improper user can be effectively prevented because an action such as opening of a window of the vehicle C is impossible.

1-7-2. Time Point t2

At t2, the user operates the wireless key W to unlock the door lock mechanisms 26.

In response to the user operation, the wireless key W transmits to the vehicle control system SY a wireless signal commanding unlocking of the door lock mechanisms 26 (hereinafter referred to as "unlocking signal"). After receiving the unlocking signal via the first antenna 33, the authentication apparatus 3 included in the vehicle control system SY performs the authentication process based on the ID of the wireless key W included in the unlocking signal. The authentication apparatus 3 transmits to the body control apparatus 4 an authentication result of the authentication process. When the authentication result is successful in the authentication process, the body control apparatus 4 unlocks the door lock mechanisms 26.

1-7-3. Time Point t3

At t3, the user opens a door of the vehicle C. The door can be opened by a user operation of pulling the door handle because the door lock mechanism 26 is unlocked. At this time, since the operation mode is the continuation mode, the starting apparatus 1 keeps the engine 20 running.

Moreover, when the door is opened, the door courtesy switch 28 provided in the proximity of each of the doors of the vehicle C transmits to the body control apparatus 4 a door-open signal indicating that the door is opened. The door-open signal is further transmitted to the starting apparatus 1 from the body control apparatus 4.

When receiving the door-open signal, the enabling part 62 included in the starting apparatus 1 transmits a permit signal that permits control of the non-driving-system electrical equipment, to control apparatuses that control the non-driving-system electrical equipment. When receiving the permit signal, each of the control apparatuses implements control of the electrical equipment in response to a user operation. As a result, the functions of the non-driving-system electrical equipment, such as the powered window apparatus 43, are enabled.

In this case, it can be presumed that the proper user gets in the vehicle C because the door of the vehicle C is opened after the authentication is ended successfully based on the ID of the wireless key W. Therefore, the vehicle control system SY enables the functions of the non-driving-system electrical equipment that have been disabled. Thus, when getting in the vehicle C, the user can use the functions of the non-driving-system electrical equipment even during from when the user gets in the vehicle C to when the vehicle C is ready to run (until the first ignition switch b is turned on with the engine key K), which improves the convenience of the user.

Since a window cannot be opened or closed until a door is opened, intrusion into or an unauthorized use of the vehicle C by an improper user can be prevented. Moreover, after the door is opened, the user can open or close a window. Therefore, convenience of the user is improved.

However, at t3, the functions of the driving-system electrical equipment, such as the steering apparatus 71, remain disabled. Therefore, the user can sense that the vehicle C is not ready to run because he/she cannot use the functions of the driving-system electrical equipment.

1-7-4. Time Point t4

At t4, the user inserts the engine key K into the key insertion opening H of the key cylinder 35 provided in the vehicle C and turns the engine key K. Accordingly, the first ACC switch a and the first ignition switch h are turned on. Since the engine 20 of the vehicle C has already started, the user does not need to turn the engine key K to the position where the first starter switch c is turned on. At the t4, also, the engine 20 keeps running.

When being inserted into the key insertion opening H, the engine key K transmits a wireless signal to the transponder 34. After receiving the signal, the transponder 34 transmits the ID included in the signal to the authentication apparatus 3. The authentication apparatus 3 performs the authentication process based on the ID received of the engine key K. The authentication apparatus 3 transmits to the body control apparatus 4 an authentication result of the authentication process.

When the authentication result relating to the engine key K is unsuccessful, the body control apparatus 4 reports an unauthorized use of the vehicle C to the outside of the vehicle C. Concretely, the body control apparatus 4 causes the buzzer 29 to output an alarm and causes the hazard light 25 to emit light.

Moreover, when the first ignition switch b is tuned on by the engine key K, the starting apparatus 1 enables the functions of driving-system electrical equipment that have been disabled. Thus, the vehicle C becomes ready to run. Concretely, the enabling part 62 transmits a permit signal that permits control of the driving-system electrical equipment, to control apparatuses that control the driving-system electrical equipment. When receiving the permit signal, each of the control apparatuses implements control of the electrical equipment in response to a user operation. As a result, the functions of the driving-system electrical equipment, such as the steering apparatus 71 and the braking apparatus 72, are enabled.

In this case, it can be presumed that the proper user gets in the vehicle C because the authentication is successful based on the ID of the wireless key W. Therefore, when the first ignition switch b is turned on by the engine key, the vehicle control system SY causes the vehicle C to be ready to run. Thus, stealing of the vehicle C can be prevented because the functions of the driving-system electrical equipment are enables when the first ignition switch b is turned on by use of the engine key K.

Moreover, when the authentication is unsuccessful based on the ID of the engine key K, an unauthorized use of the vehicle C is reported to the outside of the vehicle C in order to prevent stealing of the vehicle C.

1-8. Flowchart

Figure 5:
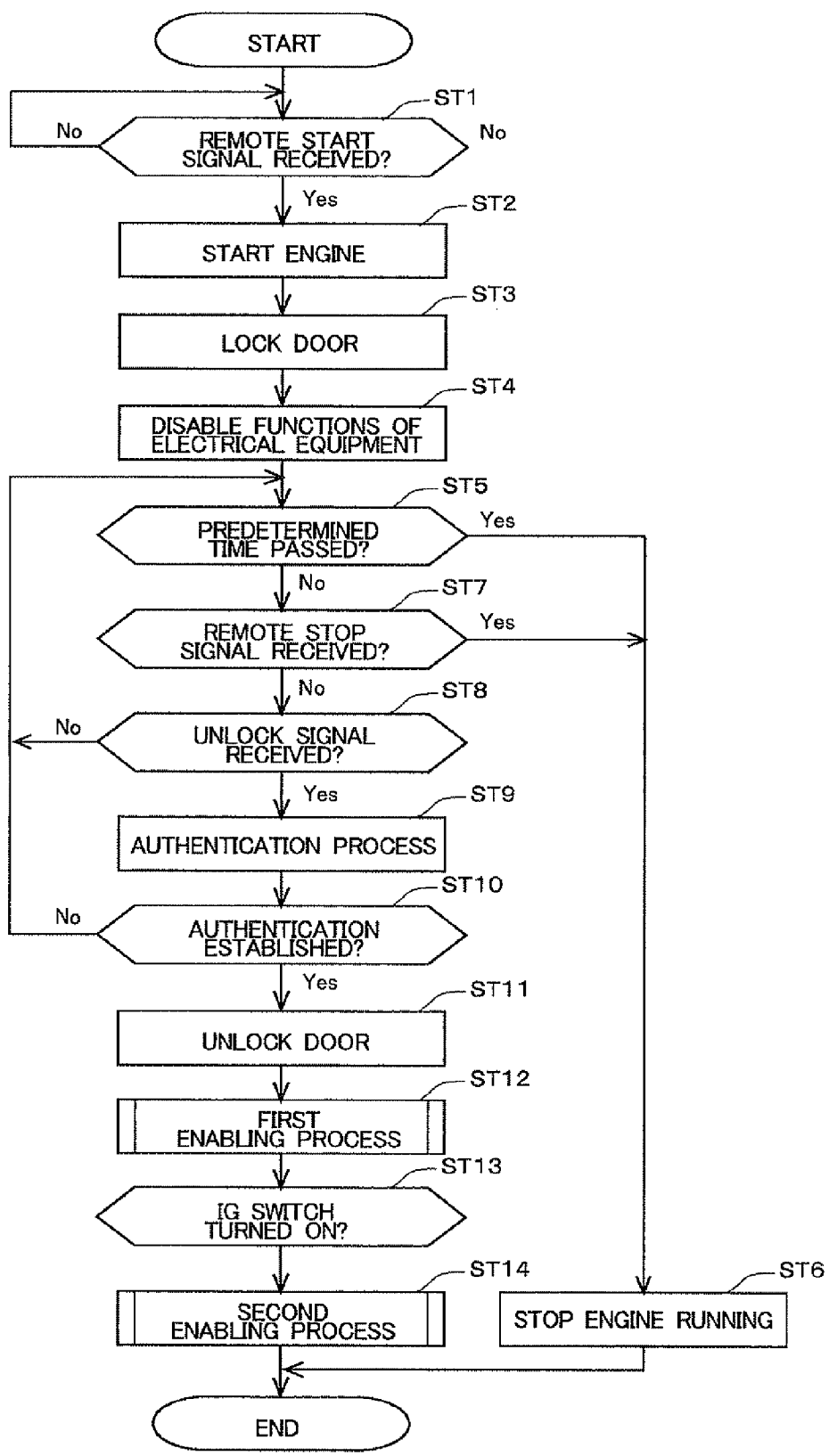
FIG. 5 illustrates a flowchart that shows a process of the vehicle control system.

FIG. 5 illustrates a flowchart of a process performed by the vehicle control system SY in the continuation mode of the operation modes. A flow of the process performed by the vehicle control system SY is described below. At a starting point of the process, the engine 20 is supposed to be stopped.

The starting apparatus 1 stands by for the remote start signal commanding the engine 20 to start, transmitted from the remote control R (a step ST1).

When receiving the remote start signal (Yes in the step ST1), the starting apparatus 1 turns on the switches Ra, Rb, and Re provided to the starting apparatus 1. Thus, once electric power is provided to the electrical equipment from the battery 31, the starter motor 24 starts running and then the engine 20 starts (a step ST2). Moreover, the starting apparatus 1 transmits to the body control apparatus 4 a signal indicating that the engine 20 starts in response to the remote start signal.

When receiving the signal, the body control apparatus 4 locks the door lock mechanisms 26 for all doors of the vehicle C (a step ST3). Thus, intrusion into the vehicle C by an improper user can be prevented after the engine 20 has been started.

Then, the disabling part 61 of the starting apparatus 1 transmits to each of the control apparatuses other than the engine control apparatus 2, the authentication apparatus 3 and the air conditioner control apparatus 5, the prohibition signal prohibiting the control of the electrical equipment. Thus, the functions of both the non-driving-system and the driving-system electrical equipment are disabled (a step ST4).

Next, the starting apparatus 1 determines whether or not a predetermined time period (e.g., 15 minutes) has passed since the start of the engine 20 (a step ST5).

When the predetermined time period has passed since the start of the engine 20, the starting apparatus 1 transmits to the engine control apparatus 2 a stop signal commanding the engine 20 to stop running. When receiving the stop signal, the engine control apparatus 2 stops the engine 20 running (a step ST6). In other words, when the predetermined time period has passed without an operation by the proper user since the remote start of the engine 20 of the vehicle C, the driving of the engine 20 is stopped. Thus, it can be prevented that the vehicle C is left, for a long time period, at risk of being used by an improper user without an authorization.

The starting apparatus 1 determines whether or not the starting apparatus 1 has received, during the predetermined time period from the start of the engine 20, a wireless signal commanding the engine 20 to stop running (hereinafter referred to as "remote stop signal) from the remote control R (a step ST7). When receiving the remote stop signal (Yes in the step ST7), the starting apparatus 1 transmits the stop signal to the engine control apparatus 2. When also receiving the stop signal, the engine control apparatus 2 stops the engine 20 running (the step ST6).

When the starting apparatus 1 does not receive the remote stop signal, it is determined whether or not the authentication apparatus 3 has received the unlocking signal from the wireless key W (a step ST8). When the authentication apparatus 3 does not receive the unlocking signal, the process returns to the step ST5 and the starting apparatus 1 determines whether or not the predetermined time period has passed since the start of the engine 20.

When receiving the unlocking signal, the authentication apparatus 3 performs the authentication process of determining, based on the ID of the wireless key W included the unlocking signal, whether or not the wireless key W is authentic (a step ST9). The authentication apparatus 3 transmits the authentication result of the authentication process to the body control apparatus 4.

The body control apparatus 4 determines whether or not the authentication result received is successful (whether or not the wireless key W is determined to be authentic) (a step ST10).

When the authentication result is unsuccessful (the wireless key W is not determined to be authentic) (No in the step ST10), the process returns to the step ST5 and the starting apparatus 1 determines whether or not the predetermined time period has passed since the start of the engine 20.

When the authentication result is successful (the wireless key W is determined to be authentic) (Yes in the step ST10), the body control apparatus 4 unlocks the door lock mechanisms 26 (a step ST11). Thus, when the wireless key. W is determined to be authentic, the door lock mechanisms 26 are unlocked. Therefore, intrusion into or an unauthorized use of the vehicle C by an improper user can be prevented.

When the authentication is successful, next performed is a first enabling process for enabling the functions of the non-driving-system electrical equipment (a step ST12). The details of the first enabling process will be described later.

When the functions of the non-driving-system electrical equipment are enabled, the starting apparatus 1 stands by for a user operation commanding the vehicle C to be ready to run. Concretely, the starting apparatus 1 determines, based on a signal from the first ignition switch b, whether or not the first ignition switch b is turned on by the engine key K (a step ST13).

When the first ignition switch b is turned on by the engine key K, next performed is a second enabling process for enabling the functions of the driving-system electrical equipment. Concretely, the enabling part 62 transmits the permit signal that permits control of the driving-system electrical equipment, to control apparatuses that control the driving-system electrical equipment. Thus, the functions of the driving-system electrical equipment, such as the steering apparatus 71 and the braking apparatus 72, are enabled. As a result, the vehicle C becomes ready to run (a step ST14).

1-9. First Enabling Process

Figure 6:
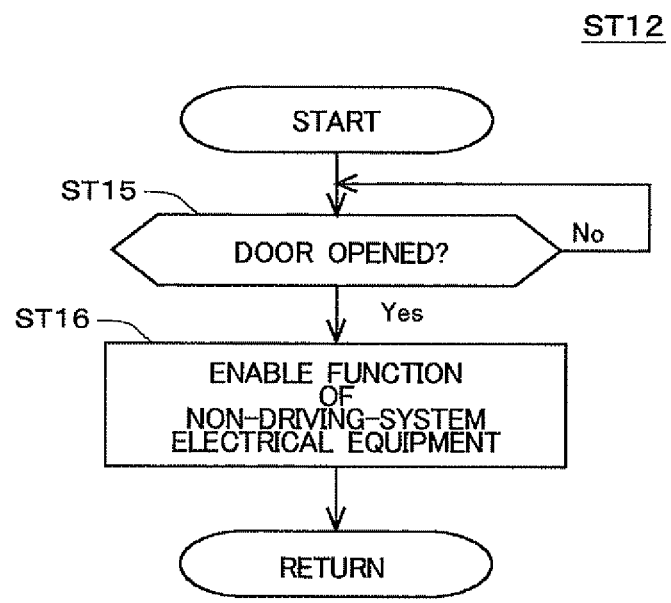
FIG. 6 illustrates a flowchart that shows a first enabling process in a first embodiment.

Next, the first enabling process (the step ST12 in FIG. 5) for enabling the functions of the non-driving-system electrical equipment is described in detail. FIG. 6 illustrates a flowchart of the first enabling process.

The first step of the process is to detect that a door of the vehicle C is opened. Concretely, the body control apparatus 4 determines whether or not the door courtesy switch 28 transmits the door-open signal (a step ST15).

When a door of the vehicle C is opened and the body control apparatus 4 receives the door-open signal, the body control apparatus 4 transmits the door-open signal to the starting apparatus 1. When the starting apparatus 1 receives the door-open signal, the enabling part 62 of the starting apparatus 1 enables the functions of the non-driving-system electrical equipment (a step ST16). Thus, the user can use the functions of the non-driving-system electrical equipment, such as the powered window apparatus 43.

However, at this time, the function only of the electrical equipment corresponding to the door which is opened, out of a plurality of doors of the vehicle C, may be enabled. The door courtesy switch 28 is provided to each of the plurality of doors of the vehicle C. Thus, a door opened can be identified by identifying the door courtesy switch 28 that has transmitted the door-open signal.

In this case, the enabling part 62 identifies the door opened (hereinafter referred to as "subject door") and transmits a permit signal including information indicating the subject door (hereinafter referred to as "specified permit signal") to the control apparatuses that controls the non-driving-system electrical equipment. Thus, the functions only of the non-driving-system electrical equipment corresponding to the subject door are enabled.

As shown in FIG. 7, the powered window apparatus 43, the cabin lighting 47, the seat heater 48, the reclining apparatus 49, the side mirror 50, and the external communications apparatus 53 are correspondingly provided to each of the plurality of doors of the vehicle C. As for the non-driving-system electrical equipment shown in a table in FIG. 7, when a door is opened, the functions of only the electrical equipment corresponding to the subject door are enabled.

When receiving the specified permit signal, the powered window control apparatus 6 implements control only of the powered window apparatus 43 corresponding to the subject door, out of the powered window apparatuses 43 provided to all doors of the vehicle C. In other words, the functions of only the powered window apparatus 43 corresponding to the subject door are enabled. Thus, the user can open and close only the window corresponding to the subject door.

When receiving the specified permit signal, the light control apparatus 10 implements control only of the cabin lighting 47 provided above a seat corresponding to the subject door, out of the entire cabin lighting 47 in the cabin of the vehicle C. In other words, the functions only of the cabin lighting 47 corresponding to the subject door are enabled. Thus, the user can turn on the cabin lighting 47 to illuminate only the seat corresponding to the subject door.

When receiving the specified permit signal, the seat heater control apparatus 11 implements control only of the seat heater 48 corresponding to the subject door, out of all the seat heaters 48 in the cabin of the vehicle C. In other words, the functions only of the seat heater 48 corresponding to the subject door are enabled. Thus, the user can warm only the seat corresponding to the subject door.

When receiving the specified permit signal, the reclining control apparatus 12 implements control only of the reclining apparatus 49 corresponding to the subject door, out of all the reclining apparatuses 49 in the cabin of the vehicle C. In other words, the functions only of the reclining apparatus 49 corresponding to the subject door are enabled. Thus, the user, can move a backrest only of the seat corresponding to the subject door.

When receiving the specified permit signal, the mirror control apparatus 13 implements control only of the side mirror 50 corresponding to the subject door, out of all the side mirrors 50 of the vehicle C. In other words, the functions only of the side mirror 50 corresponding to the subject door are enabled. Thus, the user can change an angle only of the side mirror 50 corresponding to the subject door.

When receiving the specified permit signal, the communications control apparatus 16 implements control of only the external communications apparatus 53 provided to a seat corresponding to the subject door, out of all the external communications apparatuses 53 in the vehicle C. In other words, the functions only of the external communications apparatus 53 provided to the seat corresponding to the subject door are enabled. Thus, the user can use only the external communications apparatus 53 provided to the seat corresponding to the subject door for external phone call.

As described above, when the user opens a door of the vehicle C after remotely starting the engine 20 with the remote control R, the enabling part 62 enables the functions only of the non-driving-system electrical equipment corresponding to the door opened out of the plurality of doors of the vehicle C. Thus, possibility of an unauthorized use of the vehicle by an improper can be reduced by enabling the functions only of a part of the electrical equipment. Moreover, the user can sense that the vehicle C is not ready to run because he/she cannot use the functions of a part of the electrical equipment.

As mentioned above, in the vehicle control system SY, the starting apparatus 1 starts the engine 20 of the vehicle C in response to the wireless signal transmitted from the remote control R, and keeps the engine 20 running even when a door of the vehicle C is opened after the start of the engine 20. Moreover, the function controller 69 included in the starting apparatus 1 disables the functions of the powered window apparatus 43 and the sunroof apparatus 44 in response to the start of the engine 20 and enables the functions of the powered window apparatus 43 and the sunroof apparatus 44 when a door of the vehicle C is opened after the start of the engine 20. Therefore, since a window of the vehicle C cannot be opened or closed until the door is opened, intrusion into or an unauthorized use of the vehicle C by an improper user can be prevented. In addition, since the window can be opened or closed after the door is opened, convenience of the user is improved.

2. Second Embodiment

Next, a second embodiment is described. In the second embodiment, when a door of a vehicle C is opened after an engine 20 is remotely started, functions of non-driving-system electrical equipment to be enabled are limited. A configuration and a process of a vehicle control system SY in the second embodiment are substantially the same as the configuration and the process of the vehicle control system SY in the first embodiment. A first enabling process in the second embodiment is different from the first enabling process (the step ST12 in FIG. 5) in the first embodiment. Hereinbelow, the first enabling process is described.

Figure 8:
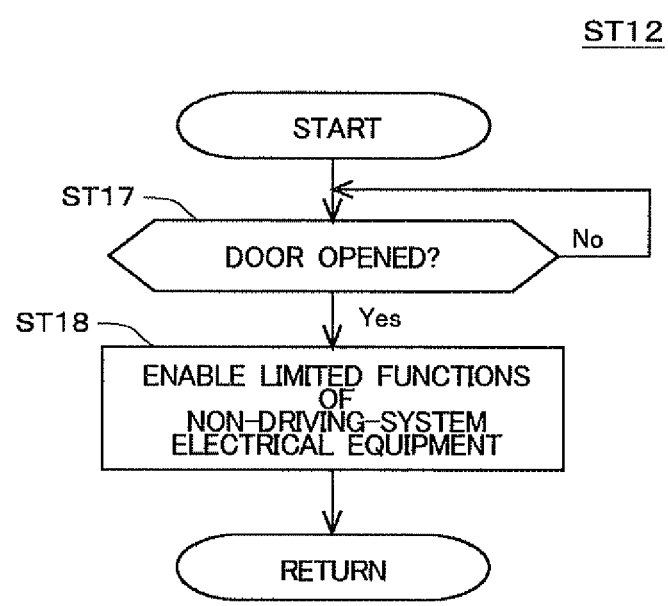
FIG. 8 illustrates a flowchart that shows a first enabling process in a second embodiment.

FIG. 8 illustrates a flowchart of the first enabling process in the second embodiment. The first step of the process is to detect that a door of the vehicle C is opened. Concretely, a body control apparatus 4 determines whether or not a door courtesy switch 28 transmits a door-open signal (a step ST17).

When a door of the vehicle C is opened and the body control apparatus 4 receives the door-open signal, the body control apparatus 4 transmits the door-open signal to a starting apparatus 1. When receiving the door-open signal, an enabling part 62 of the starting apparatus 1 transmits a permit signal to control apparatuses for the non-driving-system electrical equipment and limitedly enables the functions of the non-driving-system electrical equipment. In other words, in the second embodiment, not all the functions of the non-driving-system electrical equipment are enabled, but functions of the non-driving-system electrical equipment to be enabled are limited (a step ST18). Thus, the user can use only the functions limited of the non-driving-system electrical equipment.

As shown in a table in FIG. 9, functions of a sunroof apparatus 44, a wiper apparatus 45, a window washer 46, an instrument panel 30, a navigation apparatus 51, and an audio apparatus 52 are limited by respectively corresponding control apparatuses.

When receiving the permit signal, the sunroof control apparatus 7 implements control of the sunroof apparatus 44 and limits function of the sunroof apparatus 44. Thus, an openable range of the sunroof by the sunroof apparatus 44 is limited to about half.

When receiving the permit signal, a wiper control apparatus 8 implements control of the wiper apparatus 45 and limits functions of the wiper apparatus 45. Thus, movement of a wiper blade of the wiper apparatus 45 is limited to a predetermined number of times (e.g., once).

When receiving the permit signal, a washer control apparatus 9 implements control of the window washer 46 and limits functions of the window washer 46. Thus, number of squirts of windshield washer fluid from the window washer 46 is limited to a predetermined number of times (e.g., once).

When receiving the permit signal, an instrument panel control apparatus 14 implements control of the instrument panel 30 and limits functions of the instrument panel 30. Thus, items to be displayed on the instrument panel 30 are limited only to one or more predetermined items (e.g., two items of a fuel level and the number of revolutions of the engine).

When receiving the permit signal, a navigation control apparatus 15 implements control of the navigation apparatus 51 and the audio apparatus 52, and limits functions of the navigation apparatus 51 and the audio apparatus 52. Thus, brightness of back-lighting of a display provided to the navigation apparatus 51 is limited to a predetermined percentage (e.g., 20 percent) of usual brightness. Moreover, speaker volume of the audio apparatus 52 is limited to a predetermined level (e.g., 60 dB).

As described above, when the user opens a door after remotely starting the engine 20 with the remote control R, the functions of the non-driving-system electrical equipment to be enabled are limited. Thus, possibility of an unauthorized use of the vehicle by an improper user can be reduced by enabling only a part of the functions of the electrical equipment. Moreover, the user can sense that the vehicle C is not ready to run because he/she cannot use a part of functions of the electrical equipment.

3. Modifications

The exemplary embodiments of the invention have been described above. However, the invention is not limited to the foregoing embodiments and descriptions, and various other modifications and variations can be devised. Hereinbelow, examples of such modifications are described. Each of all embodiments including the embodiments described above and below can be optionally combined with one or more other embodiments.

In the aforementioned embodiments, such a configuration that a vehicle becomes ready to run by turning on the ignition switch and the like with the engine key K, is adopted. However, a system generally called push start system may be adopted. If the push start system is adopted, a user can make the vehicle to be ready to run by operating a push start button provided in the vehicle. In other word, when the user presses the push start button, first, the ID of an engine key is authenticated using wireless communications. When the authentication result is successful, the push start system of the vehicle turns on the ignition switch, etc., and the vehicle becomes ready to run. In such a way, even when the push start system is adopted, the ignition switch of the vehicle is turned on by the use of the engine key.

Moreover, in the aforementioned embodiments, when a door of the vehicle is opened after the engine 20 has been remotely started, the functions of the non-driving-system electrical equipment are enabled. However, when an authentication based on an ID of a wireless key W is successful, or when a door lock mechanism 26 is unlocked, the functions of the non-driving-system electrical equipment may be enabled.

Furthermore, in the aforementioned embodiments, it is explained that various functions are implemented by software performance by arithmetic processing of a CPU in accordance with a program. However, a part of these functions may be implemented by electric hardware circuitry.

While the invention has been shown and described in detail, the foregoing description is in all aspects illustrative and not restrictive. It is therefore understood that numerous other modifications and variations can be devised without departing from the scope of the invention.

What is claimed is:

1. A control method for a vehicle, including a vehicle control system comprising a starter and a controller, the control method comprising the steps of:
   (a) the vehicle control system remotely starting an engine of the vehicle in response to a first wireless signal transmitted from a remote control;
   (b) the vehicle control system disabling both a function of first electrical equipment for a non-driving system that is not related to driving of the vehicle and a function of second electrical equipment for a driving system that is related to the driving, when the engine has been remotely started;
   (c) the vehicle control system keeping the engine running when a door of the vehicle is opened after the engine has been remotely started;
   (d) the vehicle control system enabling the function of the first electrical equipment when the door is opened after the engine has been remotely started; and
   (e) the vehicle control system enabling the function of the second electrical equipment when an ignition switch of the vehicle is turned on with an engine key.

2. The control method according to claim 1, further comprising the steps of:
   (f) the vehicle control system receiving a second wireless signal transmitted from a wireless key and determining, based on the second wireless signal received, whether or not the wireless key is authentic; and
   (g) the vehicle control system unlocking a lock mechanism of the door when the wireless key is determined to be authentic.

3. The control method according to claim 1, wherein
   the first electrical equipment is provided corresponding to each of a plurality of doors of the vehicle, and
   the step (d) enables the function of only the first electrical equipment corresponding to the door which is opened, out of the plurality of doors.

4. The control method according to claim 1, wherein
   the function of the first electrical equipment enabled in the step (d) is limited.

5. A control method for a vehicle, vehicle including a vehicle control system comprising a starter and a controller, the control method comprising the steps of:
   (a) the vehicle control system remotely starting an engine of the vehicle in response to a first wireless signal transmitted from a remote control;
   (b) the vehicle control system disabling a function of a window apparatus of opening and closing a window provided on the vehicle, when the engine has been remotely started;
   (c) the vehicle control system keeping the engine running when a door of the vehicle is opened after the engine has been remotely started; and
   (d) the vehicle control system enabling the function of the window apparatus of opening and closing the window provided on the vehicle, when the door is opened after the engine has been remotely started.

6. The control method according to claim 5, further comprising the steps of:
   (e) the vehicle control system receiving a second wireless signal transmitted from a wireless key and determining, based on the second wireless signal received, whether or not the wireless key is authentic; and
   (f) the vehicle control system unlocking a lock mechanism of the door when the wireless key is determined to be authentic.

7. The control method according to claim 5, wherein
   the window apparatus is provided corresponding to each of a plurality of doors of the vehicle, and
   the step (d) enables the function of only the window apparatus corresponding to the door which is opened, out of the plurality of doors.

8. The control method according to claim 5, wherein
   the function of the window apparatus enabled in the step (d) is limited.

9. A vehicle control system used for a vehicle, the vehicle control system comprising:
   an engine starter that starts an engine of the vehicle in response to a first wireless signal transmitted from a remote control and that keeps the engine running when a door of the vehicle is opened after the engine starts; and
   a function controller that
   (i) disables both a function of first electrical equipment for a non-driving system that is not related to driving of the vehicle and a function of second electrical equipment for a driving system that is related to the driving of the vehicle, in response to start of the engine by the engine starter,
   (ii) enables the function of the first electrical equipment when the door is opened after the engine has been started by the engine starter, and
   (iii) enables the function of the second electrical equipment when an ignition switch of the vehicle is turned on with an engine key.

10. The vehicle control system according to claim 9, further comprising:
    an antenna that receives a second wireless signal transmitted from a wireless key;
    an authentication part that determines, based on the second wireless signal received, whether or not the wireless key is authentic; and
    a lock controller that unlocks a lock mechanism of the door when the wireless key is determined to be authentic.

11. The vehicle control system according to claim 9, wherein
    the first electrical equipment is provided corresponding to each of a plurality of doors of the vehicle, and
    the function controller enables the function of only the first electrical equipment corresponding to the door which is opened, out of the plurality of doors.

12. The vehicle control system according to claim 9, wherein
    the function of the first electrical equipment enabled by the function controller is limited.

13. A vehicle control system used for a vehicle, the vehicle control system comprising:
    an engine starter that starts an engine of the vehicle in response to a first wireless signal transmitted from a remote control and that keeps the engine running when a door of the vehicle is opened after the engine starts; and
    a function controller that
    (i) disables a function of a window apparatus of opening and closing a window provided on the vehicle, in response to start of the engine by the engine starter, and
    (ii) enables the function of the window apparatus of opening and closing the window provided on the vehicle, when the door is opened after the engine has been started by the engine starter.

14. The vehicle control system according to claim 13, further comprising:

an antenna that receives a second wireless signal transmitted from a wireless key;
an authentication part that determines, based on the second wireless signal received, whether or not the wireless key is authentic; and
a lock controller that unlocks a lock mechanism of the door when the wireless key is determined to be authentic.

15. The vehicle control system according to claim 13, wherein
the window apparatus is provided corresponding to each of a plurality of doors of the vehicle, and
the function controller enables the function of only the window apparatus corresponding to the door which is opened, out of the plurality of doors.

16. The vehicle control system according to claim 13, wherein
the function of the window apparatus enabled by the function controller is limited.

\* \* \* \* \*